United States Patent
Aoki

(10) Patent No.: US 11,315,341 B2
(45) Date of Patent: Apr. 26, 2022

(54) INFORMATION PROCESSING APPARATUS, VERIFICATION METHOD, AND COMPUTER-READABLE RECORDING MEDIUM RECORDING VERIFICATION PROGRAM

(71) Applicant: FUJITSU LIMITED, Kawasaki (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 16/662,607

(22) Filed: Oct. 24, 2019

(65) Prior Publication Data

US 2020/0057910 A1 Feb. 20, 2020

Related U.S. Application Data

(63) Continuation of application No. PCT/JP2018/006035, filed on Feb. 20, 2018.

(30) Foreign Application Priority Data

Apr. 27, 2017 (JP) .............................. JP2017-088379

(51) Int. Cl.
*G06V 10/75* (2022.01)
*G06T 7/33* (2017.01)
(Continued)

(52) U.S. Cl.
CPC .......... *G06V 10/751* (2022.01); *G06K 9/6215* (2013.01); *G06T 7/337* (2017.01);
(Continued)

(58) Field of Classification Search
CPC ...... G06K 9/6202; G06K 9/03; G06K 9/3208; G06K 9/00087; G06K 9/00885;
(Continued)

(56) References Cited

U.S. PATENT DOCUMENTS 5,953,443 A * 9/1999 Hiratsuka .......... G06V 40/1365
340/5.83
6,134,340 A * 10/2000 Hsu .................... G06V 40/1365
382/125

(Continued)

FOREIGN PATENT DOCUMENTS

JP 2009-193417 A 8/2009
JP 2010-152706 A 7/2010
(Continued)

OTHER PUBLICATIONS

EESR—Extended European Search Report dated Apr. 1, 2020 for corresponding European Patent Application No. 18792286.9.

(Continued)

*Primary Examiner* — Ping Y Hsieh
*Assistant Examiner* — Daniella M. DiGuglielmo
(74) *Attorney, Agent, or Firm* — Fujitsu Patent Center

(57) ABSTRACT

An information processing apparatus includes: a memory; and a processor coupled to the memory and configured to: calculate a positional difference and a degree of similarity in feature value between each feature point in a verification image captured by an imaging device and each of a plurality of feature points in a registered image registered in advance; and match the verification image against the registered image by using the degree of similarity to a feature point having the degree of similarity that is second highest or lower for each feature point in the registered image in a case where a positional difference from a feature point having the degree of similarity that is highest in the verification image is greater than a threshold value.

8 Claims, 13 Drawing Sheets

(51) Int. Cl.
  *G06K 9/62* (2022.01)
  *G06V 10/98* (2022.01)
  *G06V 10/24* (2022.01)
  *G06V 40/10* (2022.01)
  *G06V 40/14* (2022.01)
  *G06T 7/73* (2017.01)
  *G06V 40/12* (2022.01)

(52) U.S. Cl.
  CPC .............. *G06T 7/74* (2017.01); *G06V 10/242* (2022.01); *G06V 10/757* (2022.01); *G06V 10/98* (2022.01); *G06V 40/1353* (2022.01); *G06V 40/1371* (2022.01); *G06V 40/10* (2022.01); *G06V 40/1365* (2022.01); *G06V 40/14* (2022.01)

(58) Field of Classification Search
  CPC ....... G06K 2009/00932; G06K 9/6211; G06K 9/00093; G06K 9/00073; G06K 9/6215; G06T 7/74; G06T 7/337; G06V 10/751; G06V 10/242; G06V 10/757; G06V 10/98; G06V 40/1353; G06V 40/1371; G06V 40/10; G06V 40/1365; G06V 40/14
  USPC ........................................................ 382/115
  See application file for complete search history.

(56) References Cited

U.S. PATENT DOCUMENTS

| | | | | |
|---|---|---|---|---|
| 2001/0031075 | A1* | 10/2001 | Fujii | G06K 9/00006 382/125 |
| 2005/0084155 | A1* | 4/2005 | Yumoto | G06K 9/6202 382/190 |
| 2008/0273770 | A1* | 11/2008 | Kohout | G06K 9/00093 382/125 |
| 2011/0038540 | A1 | 2/2011 | Ahn et al. | |
| 2013/0216106 | A1 | 8/2013 | Hara et al. | |
| 2013/0329967 | A1* | 12/2013 | Abiko | G06K 9/00006 382/115 |
| 2015/0178581 | A1* | 6/2015 | Aoki | G06K 9/00087 382/115 |
| 2015/0286855 | A1* | 10/2015 | Neskovic | G06K 9/00087 382/125 |
| 2016/0104030 | A1* | 4/2016 | Matsunami | G06K 9/00006 382/115 |

FOREIGN PATENT DOCUMENTS

| | | |
|---|---|---|
| JP | 2010-160557 A | 7/2010 |
| JP | 2012-256272 A | 12/2012 |
| WO | 2012/063708 A1 | 5/2012 |

OTHER PUBLICATIONS

International Search Report and Written Opinion of the International Searching Authority, with Partial Translation (Form PCT/ISA/210,220, and 237), mailed in connection with PCT/JP2018/006035 and dated May 15, 2018. (8 pages).

\* cited by examiner

|  | X-COORDINATE | Y-COORDINATE | FEATURE VALUE |
|---|---|---|---|
| FEATURE POINT 1 | 10 | 10 | F1 |
| FEATURE POINT 2 | 20 | 12 | F2 |
| FEATURE POINT 3 | 13 | 20 | F3 |
| FEATURE POINT 4 | 21 | 25 | F4 |

REGISTERED IMAGE        VERIFICATION IMAGE

FIG. 3A

| RANK | REGISTERED IMAGE | VERIFICATION IMAGE | FEATURE VALUE SCORE |
|---|---|---|---|
| 1 | FEATURE POINT 1 | FEATURE POINT 1 | 80 |
| 2 | FEATURE POINT 2 | FEATURE POINT 1 | 50 |
| 3 | FEATURE POINT 3 | FEATURE POINT 3 | 20 |
| 4 | FEATURE POINT 4 | FEATURE POINT 4 | 10 |

FIG. 3B

| RANK | REGISTERED IMAGE | VERIFICATION IMAGE | MOVEMENT AMOUNT | FEATURE VALUE SCORE |
|---|---|---|---|---|
| 1 | FEATURE POINT 1 | FEATURE POINT 1 | (10,9) | 80 |
| 2 | FEATURE POINT 2 | FEATURE POINT 2 | (12,11) | 70 |
| 3 | FEATURE POINT 3 | FEATURE POINT 2 | (-50,50) | 60 |
| 4 | FEATURE POINT 4 | FEATURE POINT 4 | (9,11) | 30 |

FIG. 7

| RANK | REGISTERED IMAGE | VERIFICATION IMAGE | | MOVEMENT AMOUNT | FEATURE VALUE SCORE |
|---|---|---|---|---|---|
| 1 | FEATURE POINT 1 | FIRST PLACE | FEATURE POINT 1 | (10,9) | 80 |
| | | SECOND PLACE | FEATURE POINT 4 | (-20,-30) | 75 |
| 2 | FEATURE POINT 2 | FIRST PLACE | FEATURE POINT 2 | (12,11) | 70 |
| | | SECOND PLACE | FEATURE POINT 1 | (40,-9) | 20 |
| 3 | FEATURE POINT 3 | FIRST PLACE | FEATURE POINT 2 | (-50,50) | 60 |
| | | SECOND PLACE | FEATURE POINT 3 | (10,12) | 55 |
| 4 | FEATURE POINT 4 | FIRST PLACE | FEATURE POINT 4 | (9,11) | 30 |
| | | SECOND PLACE | FEATURE POINT 2 | (20,40) | 10 |

INFORMATION PROCESSING APPARATUS, VERIFICATION METHOD, AND COMPUTER-READABLE RECORDING MEDIUM RECORDING VERIFICATION PROGRAM

CROSS-REFERENCE TO RELATED APPLICATION

This application is a continuation application of International Application PCT/JP2018/006035 filed on Feb. 20, 2018 and designated the U.S., the entire contents of which are incorporated herein by reference. The International Application PCT/JP2018/006035 is based upon and claims the benefit of priority of the prior Japanese Patent Application No. 2017-088379, filed on Apr. 27, 2017, the entire contents of which are incorporated herein by reference.

FIELD

The embodiments relates to a verification apparatus, a verification method, and a verification program.

BACKGROUND

Verification using feature points is used in biometric authentication and the like.

Related art is disclosed in International Publication Pamphlet No. WO 2012/063708.

SUMMARY

According to an aspect of the embodiments, an information processing apparatus includes: a memory; and a processor coupled to the memory and configured to: calculate a positional difference and a degree of similarity in feature value between each feature point in a verification image captured by an imaging device and each of a plurality of feature points in a registered image registered in advance; and match the verification image against the registered image by using the degree of similarity to a feature point having the degree of similarity that is second highest or lower for each feature point in the registered image in a case where a positional difference from a feature point having the degree of similarity that is highest in the verification image is greater than a threshold value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A is an example diagram illustrating results of feature point pairs. FIG. 3B is an example diagram illustrating movement amounts.

FIG. 7 is an example diagram illustrating a pair information list.

DESCRIPTION OF EMBODIMENTS

In the feature point matching method, a feature value of a feature point of a registered image is matched against a feature value of a feature point of a verification image. For example, a loop is performed for a registered feature point to search for a verification feature point to be paired with the registered feature point. A verification feature point having the most similar feature value is selected as a feature point to be paired with the registered feature point, based on comparison with verification feature points located at spatial distances equal to or less than a threshold value. Note that there may be a positional shift between a registered image and a verification image in some cases. For example, two images are close to each other to match the two images against each other.

Meanwhile, the verification feature point to be paired with the registered feature point is selected from among verification feature points located at relatively short spatial distances. However, if the verification feature point is located too far when considered as a pair, the verification feature point is not necessarily an appropriate feature point corresponding to the registered feature point. In this case, there is a possibility that authentication accuracy may decrease.

In one aspect, a verification apparatus, a verification method, and a verification program capable of improving authentication accuracy may be provided.

Figures 1A, 1B:
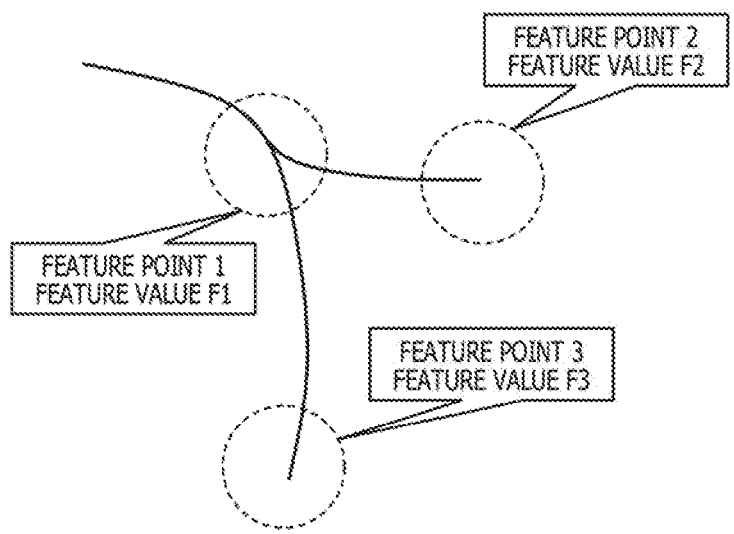
FIGS. 1A and 1B are example diagrams illustrating feature points and feature values.

An outline of a matching method (feature point matching method) using feature points will be described before description of embodiments. In the feature point matching method, characteristic points (feature points) in an image are extracted, and verification is performed based on feature values calculated from images of the vicinity of the feature points. For instance, as exemplified in FIGS. 1A and 1B, a branch point of a fingerprint or a vein, or the like is extracted as a feature point, and a feature value is calculated from an image of the vicinity of the feature point. As specific feature values, there are various methods such as LPQ (disclosed in, for example, Blur Insensitive Texture Classification Using Local Phase Quantization).

Figure 2:
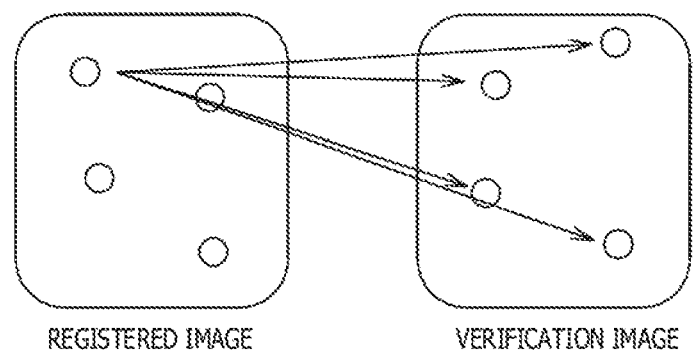
FIG. 2 is an example diagram illustrating a search for feature point pairs.

Although various methods can be used for a verification process, an example will be described below. First, as exemplified in FIG. 2, feature values of feature points of a registered image registered in advance (hereinafter referred to as registered feature points) are compared with feature values of feature points of a verification image obtained by the photographing of a subject at the time of authentication (hereinafter referred to as verification feature points). Thus, a search is made for feature point pairs. Note that it is assumed that approximate alignment normalization of the registered image and the verification image has been completed. Normalization of a position, a rotation, or the like in the X and Y directions can be used as alignment normalization.

First, a loop is performed for a registered feature point to search for a verification feature point to be paired with the registered feature point. Here, two indices of (1) spatial distance (X, Y distance) and (2) feature value score are used in the search for a feature point pair. A distance between the coordinates (Xri, Yri) of a registered feature point to which attention is being paid and the coordinates (Xii, Yii) of a verification feature point is found as a spatial distance. The spatial distance being equal to or less than a threshold value Rth is set as a condition for the search for a feature point pair. A search is made for a verification feature point having the highest feature value score among feature points located at distances equal to or less than a predetermined distance.

For example, the degree of similarity is calculated as a feature value score. The degree of similarity indicates a degree to which feature values are similar to each other. A search is made for a verification feature point provided with the highest feature value score. FIG. 3A is an example diagram illustrating results of all the feature point pairs obtained. A matching score is determined from the results so as to determine whether the verification image has been successfully authenticated based on comparison with the registered image. For example, the feature point pairs are sorted by feature value score. Then, higher-ranking feature value scores (for example, feature value scores ranked in the top 10) are averaged, and the average is treated as a matching score. If the matching score is equal to or higher than a threshold value, authentication is successful. Note that the sorting order is hereinafter referred to as a rank. For example, a feature point pair placed first in the result of sorting is considered to be ranked first, and a feature point pair placed second in the result of sorting is considered to be ranked second.

Here, authentication accuracy is improved as a result of performing a process of selecting feature point pairs while focusing on a positional difference (movement amount). The movement amount refers to a difference in coordinates between a pair of corresponding points obtained. For example, it is assumed that a registered feature point 1 has coordinates of (100, 100). It is assumed that a verification feature point 1 is a verification feature point with the highest feature value score, and has coordinates of (90, 91). In this case, a movement amount between the registered feature point 1 and the verification feature point 1 is found to be (10, 9). Thus, a movement amount is determined for each corresponding point. FIG. 3B is an example diagram illustrating movement amounts based on results different from those in FIG. 3A.

Here, it is possible to determine that a feature point pair largely deviated from an overall average movement amount is considered incorrect corresponding points. In the example of FIG. 3B, the movement amount of a feature point pair ranked third is largely deviated from the movement amounts of other feature point pairs. Therefore, it is possible to enhance authentication accuracy by excluding the feature point pair ranked third from a calculation target of a matching score.

As described above, a verification process is performed after applying approximate alignment (a normalization process such as translation correction or rotation correction) of the registered image and the verification image in advance. However, complete correction is not necessarily achieved in the normalization process, and an error may remain in some cases. Note that generally, translation does not significantly affect a feature value score. Meanwhile, rotation correction significantly affects a feature value score. For example, the above-described LPQ feature is not a rotation invariant feature. Therefore, if there is a rotational shift, a feature value score is degraded. There is a problem that a false rejection may occur in such a case.

Described in the following embodiments are a verification apparatus, a verification method, and a verification program capable of enhancing authentication accuracy by generating appropriate pairs of feature points.

First Embodiment

Figure 4A:
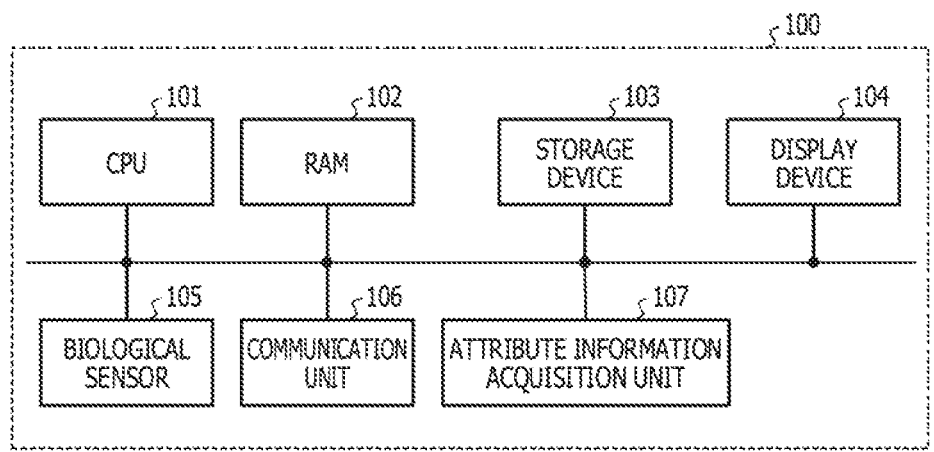
FIG. 4A is an example block diagram for describing a hardware configuration of a verification apparatus according to a first embodiment.
Figure 4B:
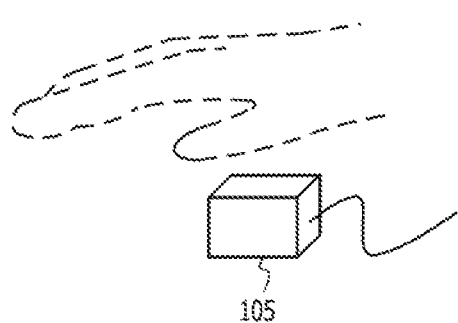
FIG. 4B is an example schematic diagram of a biological sensor.

FIG. 4A is an example block diagram for describing a hardware configuration of a verification apparatus 100 according to a first embodiment. FIG. 4B is an example schematic diagram of a biological sensor 105 to be described later. As exemplified in FIG. 4A, the verification apparatus 100 includes a CPU 101, a RAM 102, a storage device 103, a display device 104, the biological sensor 105, a communication unit 106, an attribute information acquisition unit 107, and the like. Each of these devices is coupled by a bus or the like.

The central processing unit (CPU) 101 is a central processing unit. The CPU 101 includes one or more cores. The random access memory (RAM) 102 is a volatile memory that temporarily stores, for example, a program to be executed by the CPU 101 and data to be processed by the CPU 101.

The storage device 103 is a non-volatile storage device. For example, it is possible to use, as the storage device 103, a read only memory (ROM), a solid state drive (SSD) such as a flash memory, or a hard disk to be driven by a hard disk drive. A verification program according to the present embodiment is stored in the storage device 103. The display device 104 is a liquid crystal display, an electroluminescent panel, or the like. For example, the display device 104 displays a result of each process to be described later or the like.

The biological sensor 105 is an imaging device for capturing an image of a subject. In the present embodiment, the biological sensor 105 is an imaging device for capturing an image of a user's body. As an example, the biological sensor 105 is a complementary metal oxide semiconductor (CMOS) camera, as exemplified in FIG. 4B. The biological sensor 105 can capture an image showing a feature point. Examples of such an image include a palm vein image, a fingerprint image, and a face image.

For example, the communication unit 106 is a connection interface with a local area network (LAN) or the like. The attribute information acquisition unit 107 is an input device such as a keyboard or a mouse, and is a device for inputting, for example, an ID for identifying a user, a user name, and a password.

The verification program stored in the storage device 103 is decompressed in the RAM 102 in an executable manner. The CPU 101 executes the verification program decompressed in the RAM 102. As a result, each process is performed by the verification apparatus 100. A verification process and the like are performed as a result of execution of the verification program.

Figure 5:
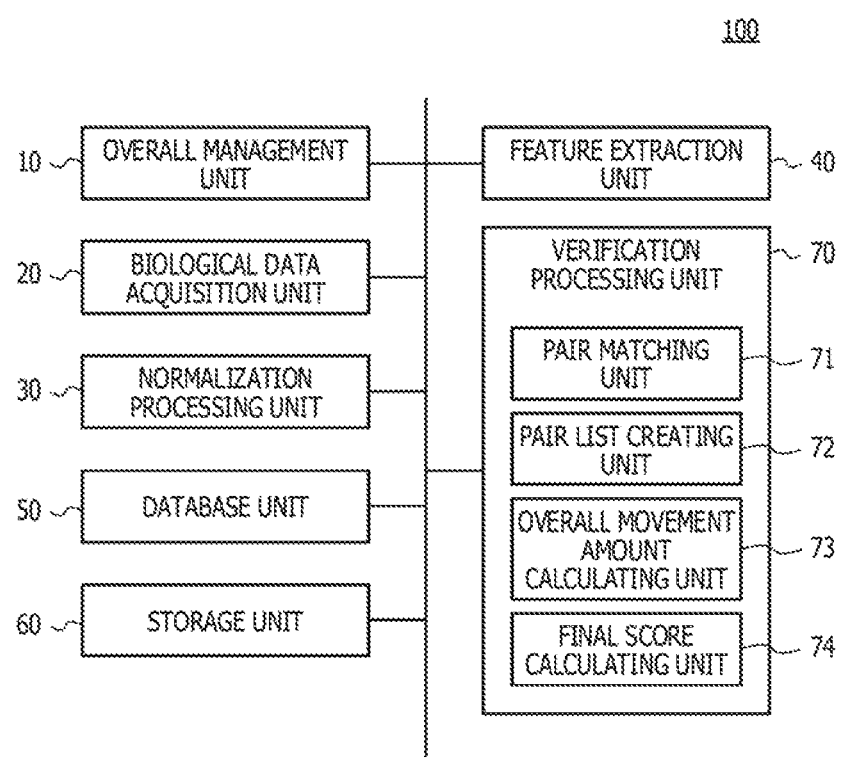
FIG. 5 is an example block diagram of each function of the verification apparatus to be implemented by execution of a verification program.

FIG. 5 is an example block diagram of each function of the verification apparatus 100 to be implemented by execution of the verification program. As exemplified in FIG. 5, an overall management unit 10, a biological data acquisition unit 20, a normalization processing unit 30, a feature extraction unit 40, a database unit 50, a storage unit 60, a verification processing unit 70, and the like are implemented by execution of the verification program. The verification processing unit 70 functions as a pair matching unit 71, a pair list creating unit 72, an overall movement amount calculating unit 73, a final score calculating unit 74, and the like.

Figure 6:
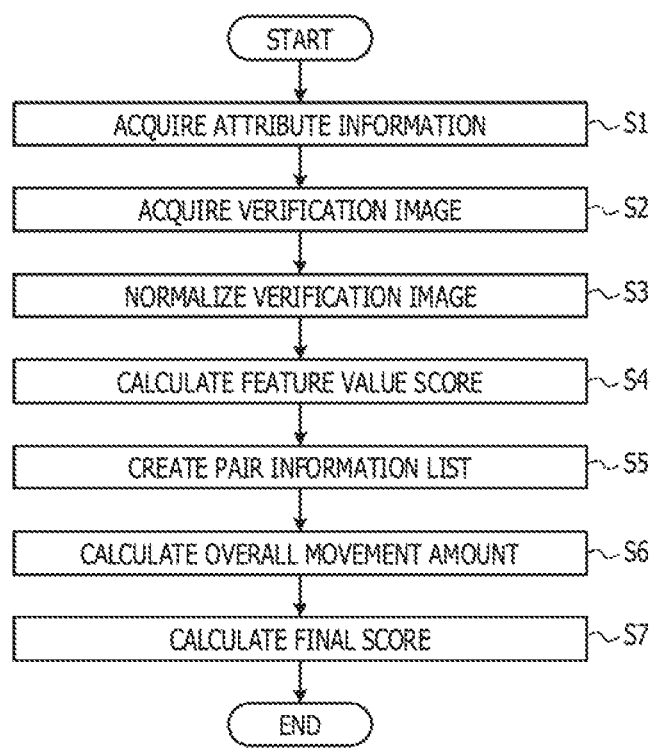
FIG. 6 is an example of a flowchart illustrating details of a verification process according to the present embodiment.

FIG. 6 is an example of a flowchart illustrating details of a verification process according to the present embodiment. As exemplified in FIG. 6, the attribute information acquisition unit 107 acquires, for example, an ID of a user as attribute information (step S1). Next, the biological data acquisition unit 20 acquires a verification image of the user's body from the biological sensor 105 (step S2).

Then, the normalization processing unit 30 acquires, from the database unit 50, a registered image corresponding to the ID acquired in step S1, and normalizes the verification image with respect to the registered image (step S3). Alignment such as translation and rotation can be performed as a normalization process. Translation can be performed based on, for example, the barycentric coordinates of a subject area (finger area or palm area). In addition, it is possible to calculate the edge of a contour to perform rotation movement based on an edge direction.

Next, the feature extraction unit 40 extracts feature points from the normalized verification image. For example, an intersection or a branch point of a fingerprint or a vein can be used as a feature point. The feature extraction unit 40 calculates a feature value as a feature value vector from an image of a calculated feature point vicinity area. The above-described LPQ or the like can be used as a specific calculation method.

Next, the pair matching unit 71 calculates, for each of registered feature points, feature value scores of verification feature points with positional differences equal to or less than a threshold value in the verification image (step S4). At this time, the pair matching unit 71 calculates movement amounts of the verification feature points relative to the registered feature point. Then, the pair list creating unit 72 creates a pair information list (step S5). FIG. 7 is an example diagram illustrating a pair information list. As exemplified in FIG. 7, data on a verification feature point with the highest feature value score are stored as data on a first-place verification feature point. Data on a verification feature point with the second-highest feature value score are stored as data on a second-place verification feature point.

Next, the overall movement amount calculating unit 73 calculates an overall movement amount from all movement amounts on the pair information list (step S6). A representative value based on statistical processing can be used as the overall movement amount. For example, an average or median of each movement amount can be used as a representative value. In addition, it is also possible to use at least any one of the movement amounts in the course of calculating the overall movement amount, by setting a limitation on feature value scores or rankings. For example, it is possible to calculate the overall movement amount by using only pairs having feature value scores equal to or higher than a predetermined threshold value or pairs with rankings equal to or higher than a predetermined ranking in the feature point pair information list. This enables information on a feature point pair having a low feature value score to be excluded. As a result, accuracy is improved.

Next, the final score calculating unit 74 calculates a final score after excluding a pair with a difference between the overall movement amount and the movement amount equal to or higher than a threshold value (step S7). For example, the final score can be calculated as follows. First, the final score calculating unit 74 refers to the feature point pair information list, and acquires N feature points ranked in the top N. N is a predetermined constant. When acquiring the top N feature points, the final score calculating unit 74 checks the movement amounts of corresponding feature point pairs. The final score calculating unit 74 excludes a corresponding feature point from score calculation if the movement amount of the corresponding feature point pair is large relative to the overall movement amount. The final score calculating unit 74 calculates an average value or the like of the feature value scores of the N feature point pairs obtained in this manner, and treats the calculated value as a final score.

Figure 8:
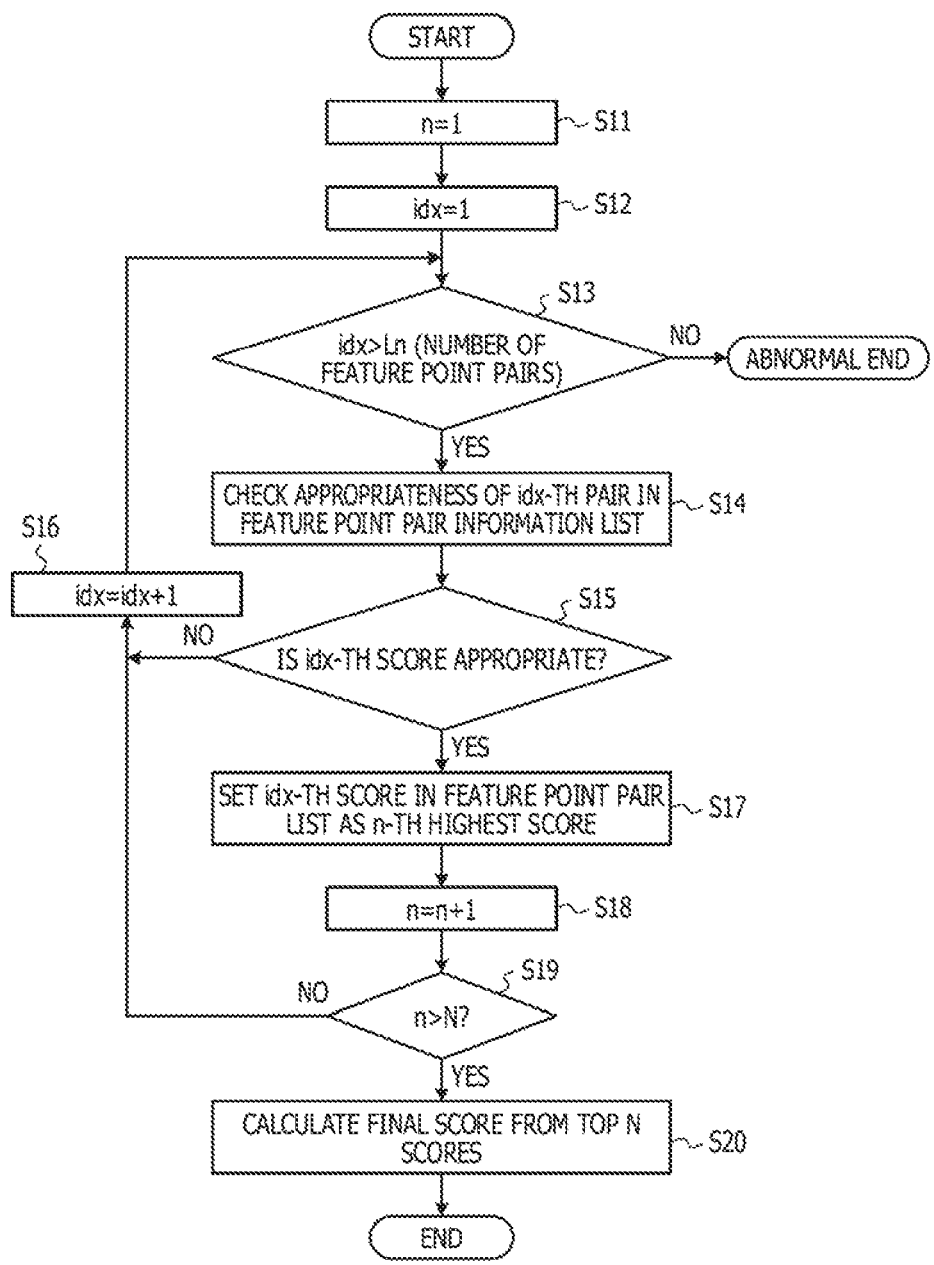
FIG. 8 is an example of a flowchart illustrating details of step S7.

FIG. 8 is an example of a flowchart illustrating details of step S7. As exemplified in FIG. 8, the final score calculating unit 74 substitutes 1 for a variable n (step S11). The variable n represents a rank currently being searched so as to find the top N feature point pairs. When the variable n=1, it means that a search is made for a pair ranked first.

Next, the final score calculating unit 74 substitutes 1 for a variable idx (step S12). The variable idx represents an attention point in the feature point pair information list, and specifically represents the line number of a line including data to which attention is being paid. In the example of FIG. 7, the first-place verification feature point among those ranked first is in the first line, the second-place verification feature point among those ranked first is in the second line, and the first-place verification feature point among those ranked second is in the third line.

Next, the final score calculating unit 74 determines whether the variable idx is larger than the number Ln of feature point pairs (step S13). The number Ln of feature point pairs is the total number of pairs in the feature point pair information list. If the determination of "No" is made in step S13, the final score calculating unit 74 ends the flowchart. This indicates failure in finding N feature point pairs, where N is a predetermined number. In such a case, a very low value is set as a matching score of the verification image and the registered image. In the example of biometric authentication, it is determined that a user is not the person in question.

Next, the final score calculating unit 74 checks the appropriateness of the idx-th pair in the feature point pair information list (step S14). This is to focus on the idx-th pair in the feature point pair information list and check whether the pair is appropriate. Specifically, determination is made based on the following. First, paying attention to the movement amount of the idx-th pair, if a difference from the overall movement amount is equal to or higher than the threshold value, it is determined that the pair is not appropriate. In addition, in the case of using the second-place pair, attention is paid to a verification point of the feature point pair to which attention is being paid. In the case of a proper pair, there should be a one-to-one correspondence between a registered point and a verification point. Therefore, it is checked whether the verification point of the feature point pair to which attention is being paid has already appeared as an appropriate feature point pair. Description will be provided based on an example illustrated in FIG. 7. Here, the first-place score of the registered feature point 1 has been given to the verification feature point 1. If a difference between the movement amount of the verification feature point 1 and the overall movement amount is less than the threshold value, it is determined that the corresponding pair is appropriate and the second-place pair is not appropriate. Furthermore, it is determined that the verification feature point 1 and the registered feature point 1 form a pair. Therefore, it is determined that it is not appropriate to regard, as a pair, a registered feature point 2 and the verification feature point 1 that is the second-place verification feature point for the registered feature point 2, at this point of time. Meanwhile, if a difference between the movement amount of the verification feature point 2, which gives the first-place score of a registered feature point 3, and the overall movement amount is equal to or higher than the threshold value, it is determined that the corresponding pair is not appropriate and the second-place pair is appropriate.

Next, the final score calculating unit 74 determines whether the feature value score of the idx-th pair is appropriate based on the result of step S14 (step S15). If the determination of "No" is made in step S15, 1 is added to idx (step S16). Subsequently, the process is performed again from step S13. If the determination of "Yes" is made in step S15, the idx-th feature value score in the feature point pair information list is set as an n-th highest feature value score (step S17). Next, the final score calculating unit 74 adds 1 to the variable n (step S18).

Then, the final score calculating unit 74 determines whether the variable n is larger than N (step S19). If the determination of "No" is made in step S19, step S16 is performed. If the determination of "Yes" is made in step S19, the final score calculating unit 74 calculates a final score from the top N scores (step S20). Subsequently, execution of the flowchart ends.

According to the present embodiment, in the case where the positional difference of the first-place verification feature point is large, the second-place verification feature point is used instead of the first-place verification feature point for each registered feature point in calculation of the final score. With this configuration, an appropriate feature point pair can be used in the case of a large rotation error or the like. For example, it is possible to exclude a verification feature point having a feature value score that has incidentally increased due to an increase in a rotation error. In addition, it is possible to use a verification feature point having a feature value score that has incidentally decreased due to an increase in a rotation error. Therefore, accuracy in calculation of a final score improves, and authentication accuracy improves accordingly.

Note that the movement amount of an inappropriate corresponding point pair varies in various directions. However, it is possible to reduce the influence of the variation by calculating the overall movement amount so as to average the amounts. Therefore, accuracy in determining the appropriateness of each feature point pair is improved by use of a difference between a movement amount and the overall movement amount when determining a positional difference of the first-place verification feature point. However, if it is determined whether a positional difference is greater than a predetermined threshold value, it is possible to determine the appropriateness of each feature point pair without using the overall movement amount.

Note that in the present embodiment, the pair information list includes only the first-place and second-place verification feature points for each registered feature point. However, the pair information list is not limited thereto. For example, a verification feature point placed third or lower may also be included. For example, in the case where not only the positional difference of the first-place verification feature point but also the positional difference of the second verification feature point exceeds a threshold value, a final score may be calculated by use of the feature value score of the third-place verification feature point having a positional difference equal to or less than the threshold value.

In the present embodiment, the biological sensor 105 functions as an example of an imaging device that captures a verification image. The pair matching unit 71 functions as an example of a similarity calculation unit that calculates the positional difference and the degree of similarity in feature value between each feature point in the verification image and each of a plurality of feature points in a registered image registered in advance. The final score calculating unit 74 functions as an example of a matching unit that matches the verification image against the registered image by using the degree of similarity to a feature point having the degree of similarity that is the second highest or lower for each feature point in the registered image in the case where a positional difference from a feature point having the highest degree of similarity in the verification image is greater than the threshold value. The overall movement amount calculating unit 73 functions as an example of a representative value calculation unit that calculates the positional difference from the feature point having the highest degree of similarity in the verification image for each feature point in the registered image to calculate a representative value from a population including at least any one of the calculated positional differences. The normalization processing unit 30 functions as an example of an alignment unit that aligns the verification image and the registered image before the verification image is matched against the registered image.

Second Embodiment

In the case of, for example, high accuracy in alignment, there are cases where higher authentication accuracy can be achieved when pairs placed second or lower are not reflected in a final score. For example, in the case where a rotation error hardly occurs, authentication accuracy is increased by use of first-place pairs alone, instead of using the pairs placed second or lower. Therefore, in a second embodiment, feature value scores placed second or lower are not reflected in the final score in the case where a normalization processing unit 30 performs a normalization process with high reliability.

Figure 9:
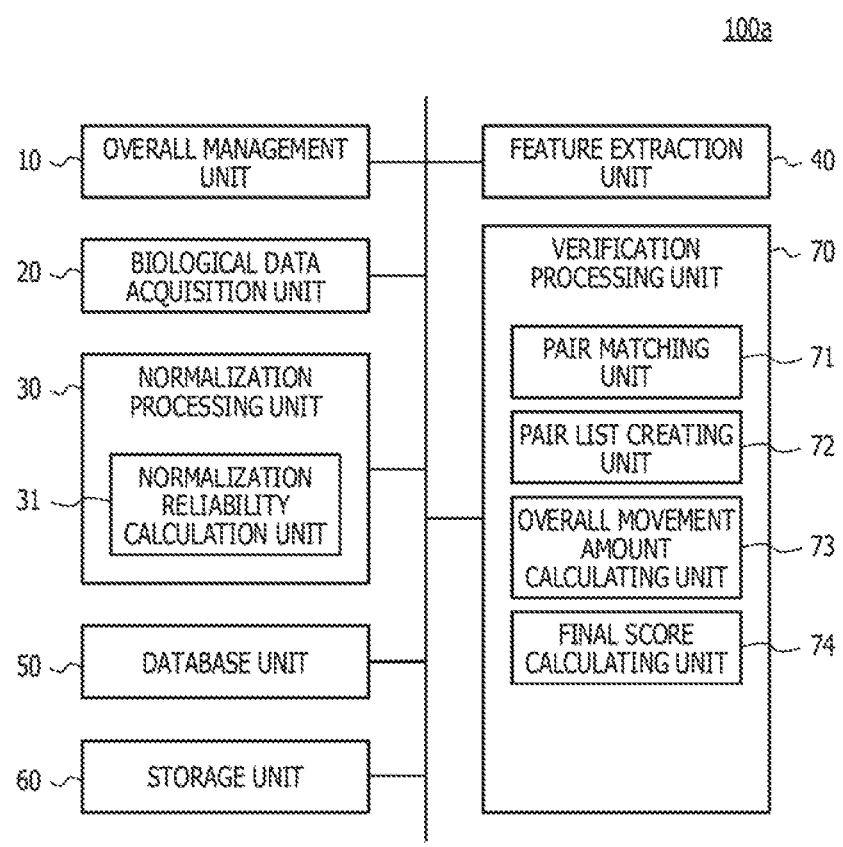
FIG. 9 is an example block diagram of each function of a verification apparatus according to a second embodiment.

FIG. 9 is an example block diagram of each function of a verification apparatus 100a according to the second embodiment. The functions of the verification apparatus 100a differ from the functions of the verification apparatus 100 according to the first embodiment in that a normalization reliability calculation unit 31 is implemented in the normalization processing unit 30.

Figure 10A:
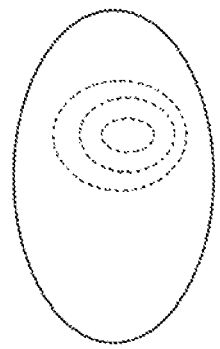
FIGS. 10A and 10B are example diagrams illustrating contours.
Figure 10B:
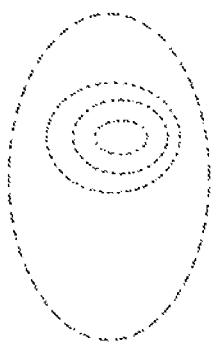

The normalization reliability calculation unit 31 calculates the reliability of a normalization process performed by the normalization processing unit 30. For example, the reliability of a rotation correction can be calculated as reliability. The reliability in this case is an index indicating the degree of accuracy of the rotation correction. That is, the reliability is a numerical value that decreases when a rotation error is large, and increases when the rotation error is small. As an example of a rotation correction, it is possible to cite a case where a rotation correction is performed by use of the contour of a subject (the contour of a finger or the contour of a palm). For instance, as exemplified in FIG. 10A, if a contour is clearly shown, a rotation correction can be accurately performed based on the contour. Therefore, a high numerical value is calculated as reliability. However, in the case where, for example, image blurring or a positional shift of the subject is significant, there may be a case where a contour is thin or not shown in the image as exemplified in FIG. 10B. In such a case, a low numerical value is calculated as reliability. Specifically, the normalization reliability calculation unit 31 calculates reliability such that reliability increases as the strength (edge strength) of contour data serving as a basis of a rotation correction increases and reliability increases as the length of a contour shown increases.

In addition, the normalization reliability calculation unit 31 may calculate reliability such that reliability increases as noise in a verification image decreases. Furthermore, reliability may be calculated by the following reliability calculation method. First, the presence or absence of environmental light such as sunlight can be used as a basis. In the presence of light from outside, it is conceivable that saturation or the like due to intense light may occur and the reliability of contour information may decrease accordingly. An illuminance sensor is provided separately from that of a CMOS camera or the like for capturing a feature image, so that reliability is calculated according to the intensity of light from outside. Furthermore, there are cases where a biometric authentication system is configured such that image data (feature images) are transferred by a network. Depending on the operational environment, it may be necessary to compress and transfer image data in some cases. For example, in the case of a very narrow network bandwidth, there are cases where image compression is essential. When an image is compressed, there are cases where image quality degradation inherent in image compression, such as block noise, occurs. For example, such a system may be configured such that reliability is set according to compression quality.

Figure 11:
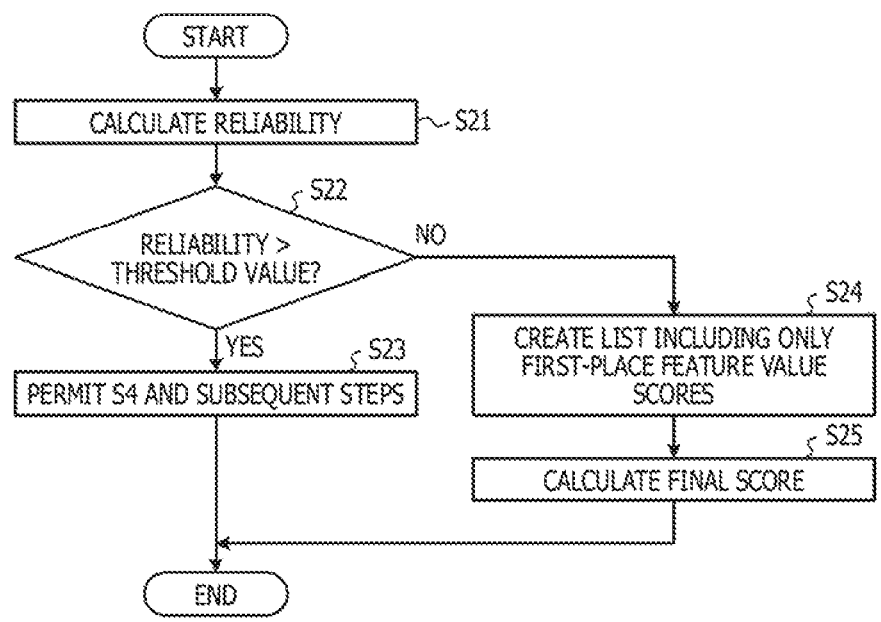
FIG. 11 is an example diagram illustrating a flowchart for determining whether to use first-place feature value scores or feature value scores placed second or lower, according to reliability.

FIG. 11 is an example diagram illustrating a flowchart for determining whether to use first-place feature value scores or feature value scores placed second or lower, according to reliability. The flowchart of FIG. 11 is performed after step S3 of the flowchart of FIG. 6 is performed. As exemplified in FIG. 11, the normalization reliability calculation unit 31 calculates the reliability of a normalized verification image (step S21). Next, an overall management unit 10 determines whether the reliability calculated in step S21 is less than a threshold value (step S22). If the determination of "Yes" is made in step S22, the overall management unit 10 permits processing of step S4 and subsequent steps in the flowchart of FIG. 6 (step S23). If the determination of "No" is made in step S22, the overall management unit 10 instructs a pair list creating unit 72 to create a list including only first-place feature value scores in step S5 of the flowchart of FIG. 6 (step S24). Next, the overall management unit 10 instructs a final score calculating unit 74 to calculate a final score only from the first-place feature value scores in step S7 of the flowchart of FIG. 6 (step S25). In this case, a verification feature point with a large positional difference may be excluded.

According to the present embodiment, when a verification image is normalized with high reliability, it is possible to exclude feature value scores placed second or lower from calculation of a final score. Meanwhile, when the reliability of normalization of a verification image is low, it is possible to reflect the feature value scores placed second or lower in calculation of the final score. As described above, it is possible to improve authentication accuracy by determining whether to use feature values placed second or lower according to the reliability of normalization of the verification image.

In the present embodiment, the normalization reliability calculation unit 31 functions as an example of a determination unit that determines whether a rotation error of the subject of a verification image is less than a threshold value, or a reliability calculation unit that calculates the reliability of a contour of the subject of the verification image.

Third Embodiment

In the second embodiment, it is dynamically determined whether a rotational shift is large by calculating the reliability of a normalization process. Meanwhile, it is not necessary to dynamically calculate the reliability of the normalization process under the operational condition in which it is assumed in advance that no rotation error will occur. Therefore, in a third embodiment, the operational condition in which a rotation error is less likely to occur, the operational condition in which a rotation error occurs, and the like are stored in advance as information such that feature value scores placed second or lower are not reflected in a final score under the operational condition in which a rotation error is less likely to occur.

Figure 12:
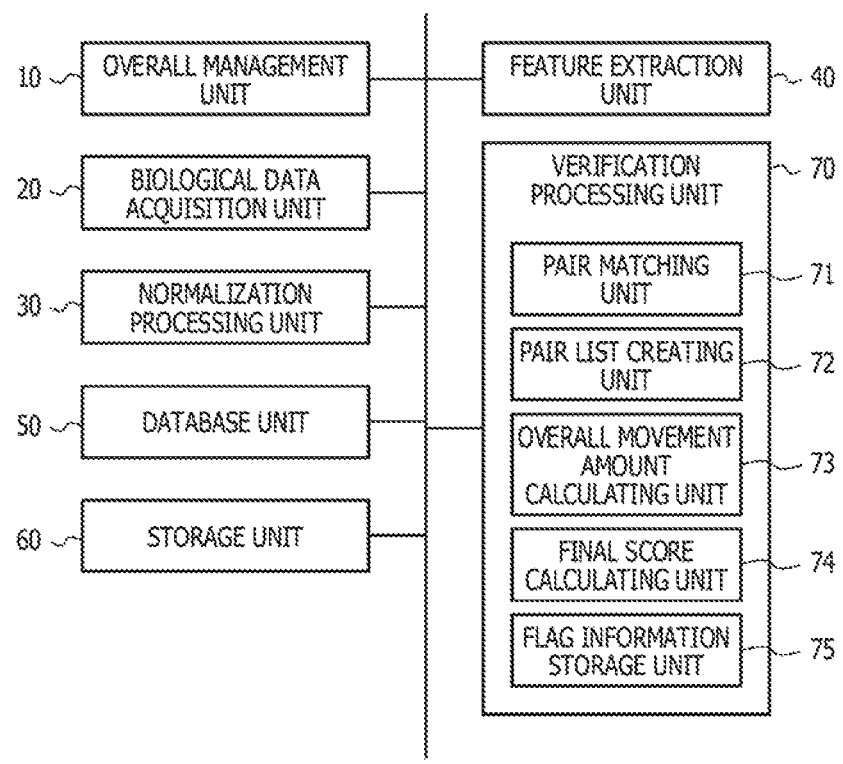
FIG. 12 is an example block diagram of each function of a verification apparatus according to a third embodiment.

FIG. 12 is an example block diagram of each function of a verification apparatus 100b according to the third embodiment. The functions of the verification apparatus 100b differ from the functions of the verification apparatus 100 according to the first embodiment in that a flag information storage unit 75 is further implemented in a verification processing unit 70. The flag information storage unit 75 stores flags for determining whether pairs placed second or lower are reflected in a final score.

For example, the flag can be switched depending on the presence or absence of a biometric authentication guide (a physical guide for holding a living body part). For example, a rotation error is less likely to occur under the operational condition in which a guide is used at the time of registration of a registered image and is also used at the time of authentication. In such a case, authentication accuracy is increased by use of first-place pairs alone, instead of using the pairs placed second or lower. Meanwhile, there is a tendency that a large rotation error is found between a registered image and a verification image under the operational condition in which the guide is used at the time of registration of the registered image and the guide is not used at the time of authentication. In such a case, feature value scores placed second or lower are reflected in a final score.

The flag information storage unit 75 stores the flag F=0 in the case of using the guide at the time of registration and authentication, and stores the flag F=1 in the case where the guide is used at the time of registration and not used at the time of authentication.

Figure 13:
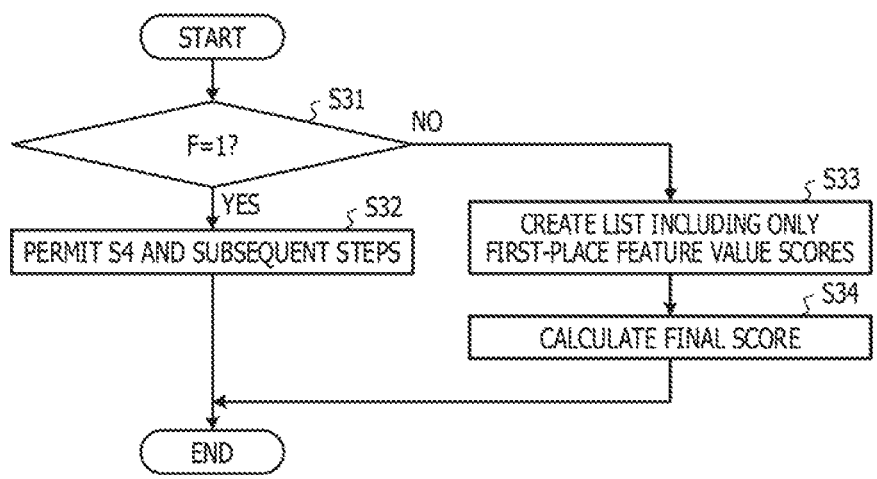
FIG. 13 is an example diagram illustrating a flowchart for determining whether to use first-place feature value scores or feature value scores placed second or lower, according to the flag F.

FIG. 13 is an example diagram illustrating a flowchart for determining whether to use first-place feature value scores or feature value scores placed second or lower, according to the flag F. The flowchart of FIG. 13 is performed after step S3 of the flowchart of FIG. 6 is performed. As exemplified in FIG. 13, an overall management unit 10 determines whether the flag F is 1 (step S31). If the determination of "Yes" is made in step S31, the overall management unit 10 permits processing of step S4 and subsequent steps in the flowchart of FIG. 6 (step S32). If the determination of "No" is made in step S31, the overall management unit 10 instructs a pair list creating unit 72 to create a list including only first-place feature value scores in step S5 of the flowchart of FIG. 6 (step S33). Next, the overall management unit 10 instructs a final score calculating unit 74 to calculate a final score only from the first-place feature value scores in step S7 of the flowchart of FIG. 6 (step S34). In this case, a verification feature point with a large positional difference may be excluded.

According to the present embodiment, it is possible to determine whether to use the feature value scores placed second or lower or only the first-place feature value scores, depending on the operational conditions of the verification apparatus. Specifically, it is possible to exclude the feature value scores placed second or lower from calculation of the final score under the operational condition in which, for example, a rotation error is less likely to occur. Meanwhile, the feature value scores placed second or lower can be reflected in calculation of the final score under the operational condition in which a rotation error is likely to occur. As described above, it is possible to improve authentication accuracy by determining whether to use feature values placed second or lower, according to operational conditions.

In the present embodiment, the flag information storage unit 75 functions as an example of a storage unit that stores the operational conditions of the verification apparatus.

Although the embodiments of the present invention have been described above in detail, the present invention is not limited to such specific embodiments, and various modifications and alterations may be made within the scope of the gist of the present invention described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An information processing apparatus comprising:
a memory; and
a processor which is coupled to the memory and performs processing of:
calculating, for each of a plurality of first feature points in a registered image registered in advance, a positional difference and a degree of similarity in feature value between the first feature point and each of a plurality of second feature points in a verification image captured by an imaging device and creating a pair information list in which a plurality of pairs of the first feature point and the second feature point each pair having the positional difference which is equal to or less than a first threshold value are associated with the positional difference and the degree of the similarity;
calculating an overall movement amount which is an average or a median of the plurality of pairs in the pair information list;
calculating a final degree of similarity by acquiring, from the pair information list, N (N is a predetermined constant) pairs ranked from the top of the degree of similarity and excluding, from the acquired N pairs, one or more pairs having a difference between the overall movement amount and the corresponding positional difference which is equal to or higher than a second threshold value; and
matching the verification image against the registered image by using the final degree of similarity.

2. The information processing apparatus according to claim 1, wherein the processor aligns the verification image and the registered image before the verification image is matched against the registered image.

3. The information processing apparatus according to claim 2, wherein the processor:
determines whether a rotation error of a subject of the verification image is less than a third threshold value; and
not uses the degree of similarity that is second highest or lower in the acquired N pairs in a case where it is determined that the rotation error is less than the third threshold value.

4. The information processing apparatus according to claim 2, wherein the processor:
calculates a reliability of a contour of a subject of the verification image;
performs the alignment by using the contour; and
not uses the degree of similarity that is second highest or lower in the acquired N pairs in a case where the reliability is equal to or higher than a fourth threshold value.

5. The information processing apparatus according to claim 1, wherein the processor:
stores an operational condition of the information processing apparatus in the memory; and
not uses the degree of similarity that is second highest or lower in the acquired N pairs in a case where the operational condition stored in the memory satisfies a predetermined condition.

6. The information processing apparatus according to claim 1, wherein the imaging device captures an image of a living body as a verification image, and the first and second feature points are feature points that appears on the living body.

7. A verification method comprising:
calculating, for each of a plurality of first feature points in a registered image registered in advance, a positional difference and a degree of similarity in feature value between the first feature point and each of a plurality of second feature points in a verification image captured by an imaging device and creating, a pair information list in which a plurality of pairs of the first feature point and the second feature point each pair having the positional difference which is equal to or less than a first threshold value are associated with the positional difference and the degree of the similarity;
calculating an overall movement amount which is an average or a median of the plurality of pairs in the pair information list;
calculating a final degree of similarity by acquiring, from the pair information list, N (N is a predetermined constant) pairs ranked from the top of the degree of similarity and excluding, from the acquired N pairs, one or more pairs having a difference between the overall movement amount and the corresponding positional difference which is equal to or higher than a second threshold value; and
matching the verification image against the registered image by using the final degree of similarity.

8. A non-transitory computer-readable recording medium recording a verification program for causing a computer to perform:

calculating, for each of a plurality of first feature points in a registered image registered in advance, a positional difference and a degree of similarity in feature value between the first feature point and each of a plurality of second feature points in a verification image captured by an imaging device and creating a pair information list in which a plurality of pairs of the first feature point and the second feature point each pair having the positional difference which is equal to or less than a first threshold value are associated with the positional difference and the degree of the similarity;

calculating an overall movement amount which is an average or a median of the plurality of pairs in the pair information list;

calculating a final degree of similarity by acquiring, from the pair information list, N (N is a predetermined constant) pairs ranked from the top of the degree of similarity and excluding, from the acquired N pairs, one or more pairs having a difference between the overall movement amount and the corresponding positional difference which is equal to or higher than a second threshold value; and matching the verification image against the registered image by using the final degree of similarity.

* * * * *